(12) United States Patent
Brueck et al.

(10) Patent No.: US 9,121,324 B2
(45) Date of Patent: Sep. 1, 2015

(54) DEVICE WITH A PARTICLE SCREEN FOR PROVIDING LIQUID REDUCING AGENT

(71) Applicant: EMITEC GESELLSCHAFT FUER EMISSIONSTECHNOLOGIE MBH, Lohmar (DE)

(72) Inventors: Rolf Brueck, Bergisch Gladbach (DE); Sven Schepers, Troisdorf (DE); Jan Hodgson, Troisdorf (DE)

(73) Assignee: EMITEC Gesellschaft fuer Emissionstechnologie GmbH, Lohmar (DE)

( * ) Notice: Subject to any disclaimer, the term of this patent is extended or adjusted under 35 U.S.C. 154(b) by 0 days.

(21) Appl. No.: 14/194,970

(22) Filed: Mar. 3, 2014

(65) Prior Publication Data
US 2014/0178266 A1 Jun. 26, 2014

Related U.S. Application Data

(63) Continuation of application No. PCT/EP2012/066365, filed on Aug. 22, 2012.

(30) Foreign Application Priority Data

Sep. 2, 2011 (DE) .......................... 10 2011 112 326

(51) Int. Cl.
| | |
|---|---|
| *B01D 11/04* | (2006.01) |
| *F04F 10/00* | (2006.01) |
| *B67D 5/58* | (2006.01) |
| *B65D 6/28* | (2006.01) |
| *F01N 3/20* | (2006.01) |

(52) U.S. Cl.
CPC ................ *F01N 3/208* (2013.01); *F01N 3/206* (2013.01); *F01N 2610/02* (2013.01); *F01N 2610/14* (2013.01); *F01N 2610/1426* (2013.01); *Y02T 10/24* (2013.01)

(58) Field of Classification Search
CPC ...... B01D 24/00; B01D 24/04; B01D 29/071; C02F 3/06; C02F 3/102
USPC ............. 422/256; 210/295, 321.69, 338, 348; 137/140; 222/189.06; 220/607
See application file for complete search history.

(56) References Cited

U.S. PATENT DOCUMENTS

| | | | |
|---|---|---|---|
| 5,699,773 A * | 12/1997 | Kleppner et al. ............. | 123/510 |
| 6,412,475 B1 | 7/2002 | Joos | |
| 8,586,895 B2 | 11/2013 | Haeberer | |
| 2007/0089403 A1 | 4/2007 | Pfeifer | |

(Continued)

FOREIGN PATENT DOCUMENTS

| | | |
|---|---|---|
| DE | 19521509 A1 | 12/1996 |
| DE | 19619992 A1 | 11/1997 |

(Continued)

*Primary Examiner* — Monzer R Chorbaji
(74) *Attorney, Agent, or Firm* — Laurence A. Greenberg; Werner H. Stemer; Ralph E. Locher (57) ABSTRACT

A device for providing a liquid reducing agent includes a tank having an interior space, a vessel at least partly disposed in the inner space of the tank, the vessel being at least partly surrounded by a particle screen through which a liquid can flow, and a delivery unit located in the vessel and configured for delivering reducing agent from the tank, through the particle screen and then out to a take-off or delivery point for reducing agent.

15 Claims, 4 Drawing Sheets

(56) References Cited

U.S. PATENT DOCUMENTS

| | | |
|---|---|---|
| 2007/0215122 A1 | 9/2007 | Nakagawa et al. |
| 2010/0175369 A1 | 7/2010 | Op De Beeck et al. |
| 2012/0181261 A1 | 7/2012 | Brueck |
| 2012/0311999 A1 | 12/2012 | Hodgson et al. |
| 2013/0025269 A1 | 1/2013 | Hodgson |
| 2013/0263938 A1 | 10/2013 | Fuchs |

FOREIGN PATENT DOCUMENTS

| | | |
|---|---|---|
| DE | 19936287 A1 | 2/2001 |
| DE | 102008031052 A1 | 1/2004 |
| DE | 10308287 A1 | 9/2004 |
| DE | 102004051746 A1 | 4/2006 |
| DE | 102006027487 A1 | 3/2007 |
| DE | 102008001948 A1 | 1/2009 |
| DE | 102009029400 A1 | 3/2011 |
| DE | 102009041179 A1 | 3/2011 |
| DE | 102010014314 A1 | 10/2011 |
| DE | 102010024554 A1 | 12/2011 |
| FR | 2918576 A1 | 1/2009 |
| JP | 2003019411 A | 1/2003 |
| JP | 2008291678 A | 12/2008 |
| WO | 2006045672 A1 | 5/2006 |
| WO | 2011/085830 A1 | 7/2011 |

* cited by examiner

DEVICE WITH A PARTICLE SCREEN FOR PROVIDING LIQUID REDUCING AGENT

CROSS-REFERENCE TO RELATED APPLICATION

This is a continuation, under 35 U.S.C. §120, of copending International Application No. PCT/EP2012/066365, filed Aug. 22, 2012, which designated the United States; this application also claims the priority, under 35 U.S.C. §119, of German Patent Application DE 10 2011 112 326.5, filed Sep. 2, 2011; the prior applications are herewith incorporated by reference in their entirety.

BACKGROUND OF THE INVENTION

Field of the Invention

The invention relates to a device for providing liquid reducing agent, including a tank for the liquid reducing agent and a delivery unit associated with the tank for delivering the liquid reducing agent from the tank to an injector for supplying the reducing agent into an exhaust-gas treatment device.

Recently, exhaust-gas treatment devices have been increasingly used for the purification of exhaust gases of (mobile) internal combustion engines. The exhaust-gas treatment devices purify the exhaust gas of the internal combustion engine with the aid of a reducing agent supplied to the exhaust gas. Mobile internal combustion engines are used, for example, for driving motor vehicles.

For example, the method of selective catalytic reduction (SCR) is known, in which the exhaust gases of an internal combustion engine are purified of nitrogen oxide compounds, by supplying a medium which reduces the nitrogen oxide compounds to the exhaust gas. Such a medium is, for example, ammonia. Ammonia is normally not stored in motor vehicles directly but rather in the form of a precursor medium, which is also referred to as reducing agent precursor. The reducing agent precursor is subsequently converted, in a reactor provided specifically for that purpose or in an exhaust-gas treatment device, to form ammonia, the actual reducing agent.

Such a reducing agent precursor is, for example, a 32.5% urea-water solution which is available under the trademark AdBlue®. Such a reducing agent precursor solution does not pose a health hazard and can therefore be stored without problems.

The reducing agent precursor or the reducing agent may contain various impurities. On one hand, those impurities should not be supplied to the exhaust gas of the internal combustion engine, because they can lead to residues in the exhaust system. On the other hand, such impurities also should not pass into a device for delivering the reducing agent, because the impurities could lead to blockages of ducts and/or valves in the device.

One important demand on devices for providing reducing agent is also the fact that such devices should be as inexpensive as possible. The purification of exhaust gases by using a supplied reducing agent constitutes a considerable additional cost factor in the production and the operation of a motor vehicle.

It is already known for the reducing agent to be filtered. Such filters are however often very expensive and/or can be used (in a space-saving manner) only to a limited extent. Furthermore, there is the risk of such filters becoming blocked during ongoing operation, because the particles become stuck in the pore system and can no longer be removed. That makes it necessary for such filter systems to be exchanged at periodical intervals in order to ensure fault-free operation. That is associated with considerable costs because the filters are often difficult to access, and/or the tank must be emptied for that purpose.

SUMMARY OF THE INVENTION

It is accordingly an object of the invention to provide a device with a particle screen for providing liquid reducing agent, which overcomes the hereinafore-mentioned disadvantages and at least partially solves the highlighted technical problems of the heretofore-known devices of this general type. It is sought, in particular, to propose a particularly inexpensive, technically simple, space-saving and/or effective device for providing liquid reducing agent.

With the foregoing and other objects in view there is provided, in accordance with the invention, a device for providing liquid reducing agent, comprising a tank with an interior space and a vessel disposed at least partially in the interior space of the tank. The vessel is surrounded on the outside at least partially by a particle screen through which a flow can pass. A delivery unit which is disposed in the vessel is set up or configured to deliver reducing agent from the tank, through the particle screen through which the reducing agent can flow, and out to a take-off or delivery point for reducing agent.

In particular, a circumferential surface of the vessel is surrounded over a predominant part, or even (substantially) entirely, by the particle screen.

In this case, a liquid reducing agent is to be understood, in particular, to mean a liquid reducing agent precursor, such as for example a 32.5% urea-water solution, which can be converted into a reducing agent.

In particular, the tank for the reducing agent is produced from plastic or metal. Corresponding materials may also be used for the vessel. The vessel may be connected detachably or cohesively to the tank. The vessel is preferably disposed in the base region of the tank, in particular at the lowest point of the tank if such a point exists.

The delivery unit includes at least one of the following components: a pump, a pressure/temperature/conductivity sensor or the like, a delivery line, a heater, and an expansion element (against ice pressure). The delivery unit is positioned within the vessel. The vessel is constructed so as to be liquid-tight with respect to the tank, in such a way that the delivery unit itself is disposed not in the reducing agent bath but rather in a cavity of the vessel. The vessel has a leadthrough through which the interior space of the tank is connected through the particle screen, and through an intermediate space between the particle screen and the vessel, to the delivery unit within the vessel. Reducing agent is transferred from the tank into the delivery unit through the leadthrough, with the reducing agent being conducted from there to an injector, for example, which transfers the reducing agent into an exhaust line.

The vessel is preferably inserted into the tank wall in such a way that the vessel closes off an opening in the tank wall and the vessel extends into the interior space of the tank.

The particle screen which at least partially surrounds the vessel preferably encompasses the circumferential surface of the vessel, and if appropriate also the top side of the vessel, preferably completely. The particle screen is, in particular, disposed only between the tank wall and the vessel, in such a way that the vessel and the particle screen together can be disposed in a space-saving manner in the tank. This means, in particular, that no further component is disposed between the tank wall and the particle screen and/or between the particle screen and the vessel.

In particular, the particle screen is disposed so as to be at least partially spaced apart from the vessel, in such a way that an intermediate space is formed between the particle screen and the vessel, and purified reducing agent collects in the intermediate space. The purified reducing agent is extracted from the intermediate space by the delivery unit.

The particle screen has an outer screen surface and an inner screen surface. In this case, the outer screen surface means that side of the particle screen which faces away from the vessel and faces toward the interior space of the tank. The particle screen has an inner screen surface facing toward the vessel. The outer screen surface and the inner screen surface are spaced apart from one another by a depth. A particle screen differs from a—in particular porous—filter (for example a foam) in that the separation efficiency can be described by a step function.

Thus, in contrast to (depth) filters, the screen filters approximately 100% of particles ranging from particles of infinitely large diameter to particles with an, in this case, defined largest diameter (the largest diameter being precisely defined by the openings), so that particles with a smaller diameter than the largest diameter defined in this case can pass practically unhindered through the screen. In particular, the screen acts (merely) as a blockade, and/or itself has (practically) no capability for absorbing particles (for example pores). In this case, the advantages of a screen are firstly the simple construction and the high inherent rigidity, so that no further supporting structures are required. Secondly, a screen has a lower tendency to become blocked than filters, because no particles can collect in the interior of the screen. In this way, it is possible for an inexpensive and permanently ready-to-operate device to be provided which, by using the delivery unit and further components required for the provision of the reducing agent, provides adequately purified reducing agent for the exhaust system.

In particular, the particle screen used in this case is the only device provided, during operation, between the tank and the exhaust line for the removal of particles from the reducing agent. In this case it should be noted that, if appropriate, (only) a so-called assembly filter may also be provided which prevents (very large) chips or other parts formed during the assembly of the individual components from penetrating into the delivery unit and into the other required components. The assembly filters generally have a largest diameter at least 50% larger than the particle screen provided in this case. The assembly filter thus performs no appreciable function during normal operation, instead performing its function only once at the start of operation.

In accordance with another advantageous feature of the invention, the particle screen has predominantly equally dimensioned openings for the throughflow of reducing agent. In particular, the openings on the outer screen surface are connected to the oppositely disposed, in particular equally dimensioned, openings on the inner screen surface by a duct that is apart from that of closed form. There are thus no pores or other branches in the particle screen between the outer screen surface and the inner screen surface. The duct run preferably (substantially) rectilinearly. In particular, the openings are in each case congruent, that is to say correspond to one another in terms of shape, size and position/orientation. It is also preferable for all of the openings of the particle screen to have equally dimensioned openings for the through flow of reducing agent.

In accordance with a further feature of the invention, the openings each have a largest diameter of at most 50 μm, in particular of at most 30 μm.

In accordance with an added preferred feature of the invention, the particle screen includes at least one wire mesh and/or a foil. It is preferable in this case for the (metallic) foil to be formed with etched and/or punched openings. A refinement is preferable in this case in which the particle screen is formed at least partially or entirely by a (metallic) foil. The refinement of the particle screen as a foil is particularly advantageous because, in this way, it is possible for highly uniform openings to be provided, and the foil has adequate inherent rigidity in such a way that, in particular, no supporting structures are required. A wire mesh is distinguished in that the openings in the particle screen are formed by wires interwoven with one another. In this case, in the depth direction, the openings are formed in each case only by one layer of the wire mesh.

The screen may have a multi-layer form. In this context, it is particularly advantageous for a first layer of the screen to be a screen layer with a screen function. The screen layer has the openings required for the screen function (with a diameter of at most 50 μm, preferably at most 30 μm). A second layer is then preferably a support structure which has a support function. The support structure preferably has considerably larger openings than the screen layer, for example openings with a diameter of at least 10 mm. For this purpose, the support structure has considerably increased mechanical stability in relation to the screen layer, wherein the increased mechanical stability may, for example, be realized by using a large depth (material thickness) of the support structure in relation to the screen layer.

In accordance with an additional preferable feature of the invention, the openings become smaller proceeding from the outer screen surface toward the inner screen surface. This characteristic of the openings should be observed in particular during the production of the particle screen. Specifically in the case of etching or also in the case of punching, it is often the case that openings are produced which are not completely cylindrical, with a slight conicity instead being generated. In this context, however, that conicity is desirable because, through the use thereof, the reducing agent can be prevented from flowing through the particle screen back into the interior space of the tank. Through the use of the particle screen and the openings thus configured, a retention element is thus provided in such a way that an adequate fill level continues to be ensured in the vessel and/or in the intermediate space for example during cornering, under other acceleration or when the tank is inclined.

In accordance with yet another preferable feature of the invention, the particle screen has a depth between the outer screen surface and the inner screen surface of at most 0.5 mm. The particle screen is, in particular, at least partially constructed from metal or from plastic. The particle screen is preferably manufactured from a metallic material, because metallic materials exhibit particularly good heat conduction. Furthermore, a particle screen composed of metal is mechanically highly stable at all temperatures that arise during operation, and in particular, the screen action thereof (that is to say, in particular, the size of the openings that are definitive of the screen action) thus does not change, or changes only very little, with changes in temperature.

In accordance with yet a further advantageous feature of the invention, the particle screen exhibits a self-cleaning action during operation. For this purpose, it is for example expedient for the particle screen to be positioned in such a way that it can be intensively flushed with reducing agent during operation. This is, in particular, also achieved in that the outer screen surface is constructed to be as smooth as possible, that is to say it has as low a roughness as possible with an average roughness Ra of at most 0.5 µm. Through the use of a particle screen surface configured in this way, it is possible for any adherent particles to be detached again due to the flow of reducing agent passing over it. The same applies correspondingly to the refinement of the particle screen as a wire mesh. A flow passes over the particle screen during operation, for example due to sloshing movements in the tank. A particle screen is distinguished from a depth filter by the fact that particles are detached from a particle screen again by a flow passing over it. In the case of a particle screen, particles are deposited (at the outside) on a surface and can be detached again by reducing agent flowing over that surface. By contrast, in the case of a depth filter, particles are deposited primarily within the depth filter (in pores). The particles thus in fact cannot be detached purely by a flow passing over the depth filter.

In accordance with yet an added preferable feature of the invention, at least the outer screen surface (if appropriate also the inner screen surface) at least partially has hydrophobic or hydrophilic properties; if appropriate, both properties may be provided jointly. In particular, a corresponding coating is provided. A hydrophobic embodiment has the effect that an adhesion of reducing agent is prevented and reducing agent correspondingly rolls off the surface. A hydrophilic embodiment may, however, likewise also be particularly advantageous, in such a way that a liquid film is formed on the outer screen surface and any adherent particles are correspondingly flushed away even in the case of low liquid flow rates. In this connection, contact angles between the liquid, in this case reducing agent, and solid material, in this case material of the particle screen, are preferably between zero and 20° (hydrophilic), or greater than 90°, in particular greater than 120° (hydrophobic). A contact angle refers to the angle that a liquid droplet on the surface of a solid material forms relative to that surface. In the case of small contact angles (approximately 0°), the surface is referred to as hydrophilic. In the case of angles of around 90°, the surface is hydrophobic, or in the case of even greater angles, the surface is superhydrophobic.

In accordance with yet an additional advantageous feature of the invention, the particle screen has a corrugation. The corrugation serves, in particular, to enlarge the available outer screen surface and inner screen surface, in such a way that even in the case of a small largest diameter of the openings, there is an adequate passage of reducing agent into the vessel.

The particle screen may (alternatively or additionally) have a profiling and/or structuring. A profiling describes for example pattern-like surface elevations and surface depressions, wherein these preferably interact with one another and/or adjoin one another and/or are superposed on one another. In this case, the shape (as viewed in cross section) in particular deviates from a corrugated shape, and may for example include steps, teeth and the like. A structuring may include structures which are spaced apart from one another and which, in particular, do not (directly) adjoin one another, such as for example indentations, furrows and the like.

In accordance with a concomitant advantageous feature of the invention, the particle screen is connected at least to the vessel or to the tank by at least one of the following fastening types:

a) connection by at least one of the methods of clamping, pressing and bracing;
b) cohesive connection, in particular by way of adhesive bonding, brazing and/or welding;
c) at least partially encased, in particular by the vessel;
d) connection by a screw thread.

A connection by clamping, pressing and/or bracing may be realized, for example, by virtue of the particle screen having an elastic form and correspondingly having, for example, a smaller diameter than the vessel. In this case, the particle screen must be expanded in order to be mounted on the vessel, and clamping is correspondingly realized on the basis of elasticity of the particle screen. It is also possible for an elastic insert to be provided between the vessel and the particle screen, which insert is compressed between the vessel and the particle screen and thus braces the particle screen against the vessel. The particle screen may be formed in the manner of a closable bracket that can be placed around the vessel. The particle screen may have a clip element by which the bracket can be closed, placed under stress and braced circumferentially against the vessel. It is also possible for the particle screen to be braced against the vessel by way of at least one rubber band. Furthermore, detent elements may be provided which are elastically deformable and onto which the particle screen is mounted for configuration on the vessel. Furthermore, clip elements may be provided which fix the particle screen to the vessel. The particle screen is preferably fastened to the vessel by screws and/or rivets. In particular, the particle screen has, in sections, a thread in such a way that a connection between the particle screen and vessel or between the particle screen and tank base can be realized by using a screwing motion of the particle screen itself.

In particular, the particle screen is embedded into the vessel or into the vessel material. In this case, the particle screen is at least partially encased by the vessel and/or a vessel material. This may be realized by casting or deformation.

In a further advantageous embodiment, the particle screen has a heater. In particular, the particle screen is itself in the form of a heater. This may be realized by virtue of the particle screen being (at least partially) formed from a correspondingly electrically conductive material which is utilized as a resistance heater. It is preferable for corresponding heating structures to be provided on and/or in the particle screen, in such a way that frozen reducing agent can be thawed in a targeted manner at predetermined locations.

The invention may also be configured in the manner of a module for providing and delivering a reducing agent, which module has a device according to the invention and has an injector which can be disposed in/on an exhaust system. The reducing agent is thus delivered from the tank into the exhaust system through the device and the injector, wherein the particle screen is the only particle separation device between the tank and the exhaust system. The statements made above regarding the so-called assembly filters apply correspondingly in this case.

Furthermore, the invention is also directed to a motor vehicle, at least having an internal combustion engine and an exhaust system for purification of the exhaust gases of the internal combustion engine, wherein the exhaust system has an injector for supplying a reducing agent into the exhaust system, and the injector is connected to a device according to the invention for providing liquid reducing agent.

In a further advantageous embodiment, the particle screen has sufficient thermal conductivity to introduce the heat from a heater disposed in the vessel into the reducing agent in the tank. Such sufficient thermal conductivity may be realized, for example, by using a metallic particle screen and/or by using (metallic) heat-conducting bridges which extend through the particle screen from the vessel.

Provision may also be made for at least one fill level sensor to be disposed and/or integrated in and/or on the particle screen. The fill level of the reducing agent in the tank can be monitored by using a fill level sensor. The fill level sensor may be a continuous fill level sensor which permits continuous, permanent monitoring of the fill level in a (predefined) range between a minimum measurable fill level and a maximum measurable fill level. A continuous fill level sensor of that type is, for example, an ultrasound sensor.

The fill level sensor may also exhibit discrete characteristics. A discrete fill level sensor can detect only whether reducing agent is present at a certain level in the tank, and the actual fill level in the tank is thus above or below the level monitored by the fill level sensor. In particular, in the case of discrete fill level sensors, it is expedient for multiple fill level sensors to be disposed in and/or on the particle screen. It is thus possible to obtain more precise information regarding the fill level in the tank. A discrete fill level sensor of that type may be in the form of a float.

The at least one fill level sensor may, for example, be realized in the form of an electrical conductor and/or in the form of an electrical contact. The measurement of the fill level may preferably be performed by using an electrical resistance and/or electrical capacitance. The electrical resistance and/or electrical capacitance between two electrical contacts and/or two electrical conductors changes as a function of whether or not reducing agent is present at/between the contacts or at/between the conductors. This can be utilized for the determination of the fill level. The electrical contacts and/or the electrical conductors may, for example, be adhesively bonded, welded and/or brazed to the particle screen. The particle screen may also be realized in the form of a fabric or mesh. The electrical contacts and/or electrical conductors may then also be woven into the particle screen.

Other features which are considered as characteristic for the invention are set forth in the appended claims, noting that the features specified individually in the claims may be combined with one another in any desired technologically meaningful way and may be supplemented by explanatory facts from the description, with further embodiments of the invention being highlighted.

Although the invention is illustrated and described herein as embodied in a device with a particle screen for providing liquid reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
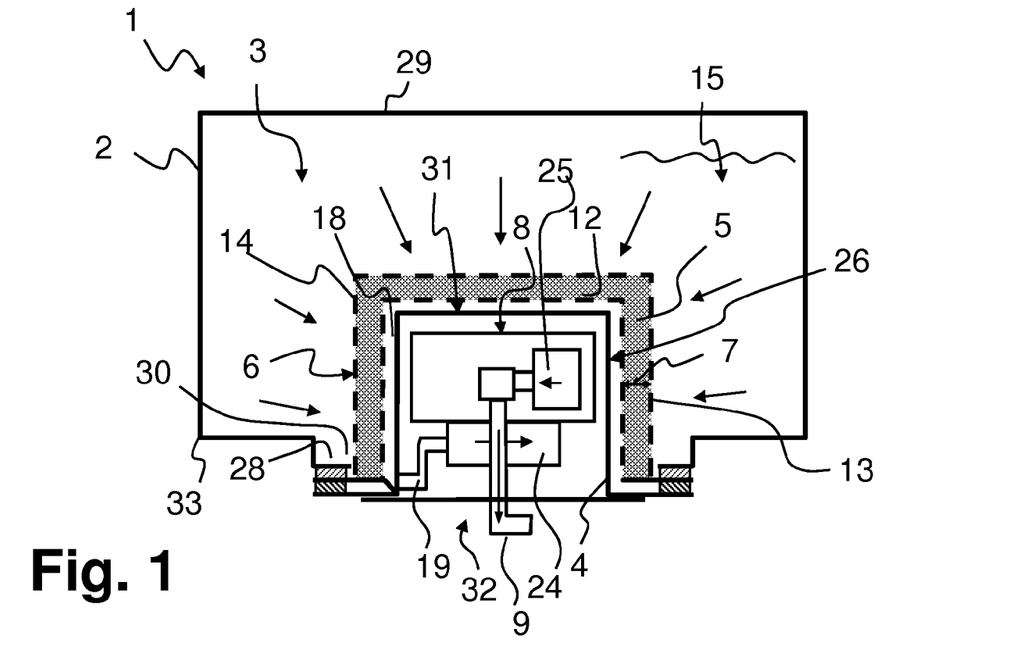
FIG. 1 is a diagrammatic, vertical-sectional view of an exemplary embodiment of a device according to the invention.

Referring now in detail to the diagrammatic figures of the drawing, in which the same reference numerals are used for identical objects for explaining the invention and the technical field in more detail by showing particularly preferred structural variants to which the invention is not restricted, and first, particularly, to FIG. 1 thereof, there is seen an exemplary embodiment of a device 1 from the side. The device includes a tank 2 with an interior space 3 in which a vessel 4 is disposed. A delivery unit 8 is disposed in the vessel 4 for delivering reducing agent 15 from the tank 2 to a non-illustrated injector. The vessel 4 is surrounded, at its circumferential surface 26, by a particle screen 5.

The particle screen 5 also extends over a top side 31 of the vessel 4. The particle screen 5 has an outer screen surface 6 and an inner screen surface 12. The outer screen surface 6 and the inner screen surface 12 are spaced apart from one another by a depth 7. The particle screen 5 has openings 13 through which the reducing agent 15 passes from the interior space 3 of the tank 2, through an intermediate space 18 illustrated therein and an extraction opening or a leadthrough 19, to the delivery unit 8 within the vessel 4. The particle screen 5 also has a coating 14 which has hydrophilic and/or hydrophobic properties, so that particles that adhere to the outer screen surface 6 are flushed away by the reducing agent 15. It is thus possible to realize a self-cleaning effect of the particle screen 5, in such a way that the particle screen 5 is permanently operable.

The tank 2 has a tank wall 29 and a sump 28 in the region of a tank base 33. The vessel 4 is fastened to the tank base 33 in the region of the sump 28. In the exemplary embodiment shown herein, the tank base 33 has a tank opening 30 in the region of the sump 28. In this case, the vessel 4 extends through the tank opening 30 into the tank 2. The vessel has a vessel base 32. In this case, the delivery unit 8 has a pump 24, a pressure sensor 25 and a take-off or removal point 9 through which the reducing agent 15 is delivered into a non-illustrated reducing agent delivery line and then to a non-illustrated injector.

Figure 2:
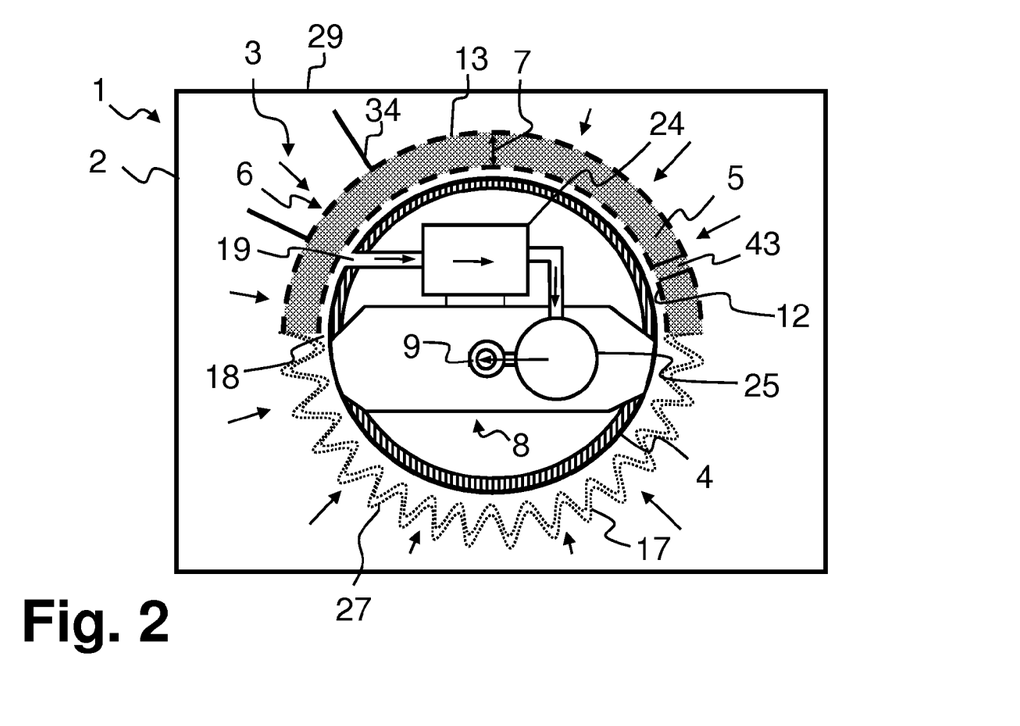
FIG. 2 is a plan view of a further exemplary embodiment of a device according to the invention.

FIG. 2 shows a further exemplary embodiment of a device 1 in a plan view. The reducing agent 15 is delivered from the interior space 3 of the tank 2 through the particle screen 5 into the intermediate space 18, and from there through the extraction opening or leadthrough 19 to the delivery unit 8. In this case, the reducing agent 15 is transported from the intermediate space 18 into the delivery unit 8 by the pump 24. The reducing agent 15 passes from the pump 24 through the pressure sensor 25 to the take-off point 9. The reducing agent 15 passes through the openings 13 into a duct 43 of the particle screen 5, and flows out of the particle screen 5 at the inner screen surface 12. The particle screen 5 has a corrugation 17. Furthermore, a heater 27 is disposed on the particle screen 5, so that the particle screen 5 can be correspondingly heated in order to liquefy frozen reducing agent 15. In this case elements 34, which are disposed on the particle screen 5 itself, extend from the outer screen surface into the interior space 3 and permit thawing of frozen reducing agent 15 in the tank interior space 3. For this purpose, the elements 34 may likewise have a heater 27, or are in heat-conducting connection with the heater 27 of the particle screen 5. Furthermore, the elements 34 serve for the calming and retention of reducing agent 15. In this way, in the event of accelerations of the tank 2 (for example as a result of accelerations of a motor vehicle), sloshing of the reducing agent 15 can be prevented, and furthermore, a minimum amount of reducing agent 15 is retained in the region of the particle screen 5, so that the openings 13 of the particle screen 5 continue to be charged with reducing agent 15.

Figure 3:
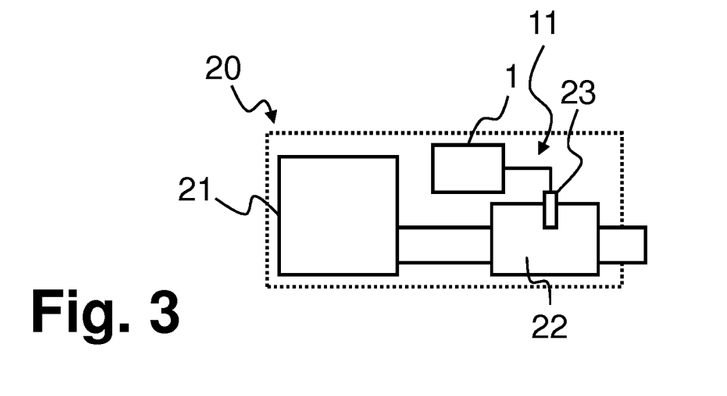
FIG. 3 is a block diagram of a motor vehicle having a module and a device according to the invention.

FIG. 3 shows a motor vehicle 20 having an internal combustion engine 21 and having an exhaust system 22. An injector 23 is disposed in or on the exhaust system 22. The injector 23 is supplied with reducing agent 15 by a device 1, in such a way that the reducing agent 15 can be transferred through the injector 23 into the exhaust system 22 for exhaust-gas treatment purposes. In this case, the device 1 and injector 23 form a module 11.

Figure 4:
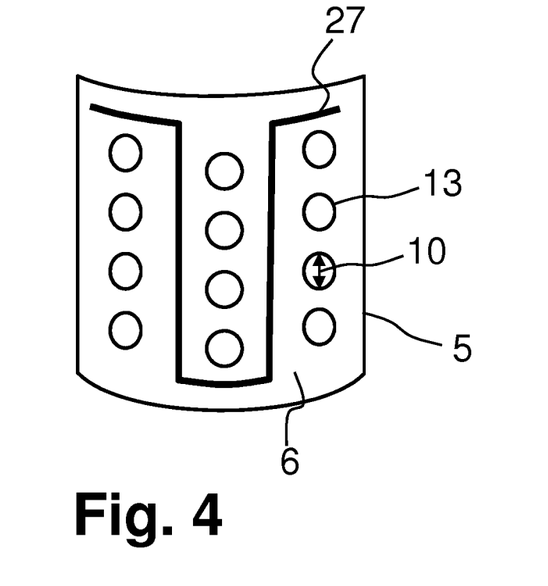
FIG. 4 is a fragmentary, perspective view of a particle screen.

FIG. 4 shows a portion of a particle screen 5 with an outer screen surface 6 and with openings 13 through which the reducing agent 15 enters the intermediate space 18 from the interior 3 of the tank 2. The openings 13 have a largest diameter 10. Due to the construction as a particle screen, particles with a diameter larger than the largest diameter 10 are prevented from passing through the opening 13, whereas particles with a diameter smaller than the largest diameter 10 pass substantially unhindered through the opening 13. Thus, in contrast to filters (pore filter, nonwoven, fabric, knit, foam or the like), a clear-cut separation efficiency is realized. A continuous clogging of the particle screen 5 with particles of different sizes, and thus progressive blockage, are thus prevented in an effective manner. In this case, a heater 27 is disposed on the outer screen surface 6. The heater may also be disposed on the inner screen surface 12 or in the particle screen 5. In the case of a metallic construction of the particle screen 5, it is also possible for the entire particle screen 5 to be utilized as a heater 27.

FIGS. 5 to 12 show different fastening types for the fastening of the particle screen 5 to the vessel 4 and/or to the tank 2. The connection types shown in the figures represent merely particularly advantageous exemplary embodiments, although a person skilled in the art may derive from these further connection types which are likewise encompassed by the present invention. The invention is thus expressly not restricted to the exemplary embodiments illustrated in the following figures.

Figure 5:
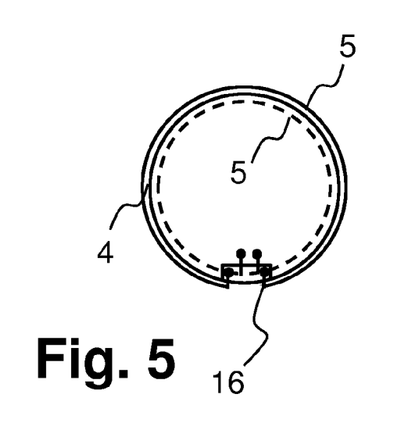
FIG. 5 is a plan view showing a fastening of the particle screen to the vessel by a clamping connection.

FIG. 5 shows, in a plan view, the vessel 4 onto which a small particle screen 5, illustrated by dashed lines, is to be mounted. The particle screen 5 has a smaller diameter or a form of smaller dimensions, so that it must be expanded in order to be mounted on the vessel 4. After the particle screen 5 (outer, solid line) has been mounted on the vessel 4, the particle screen has been elastically deformed and correspondingly enlarged in such a way that a connection 16 is produced between the vessel 4 and particle screen 5 by clamping.

Figure 6:
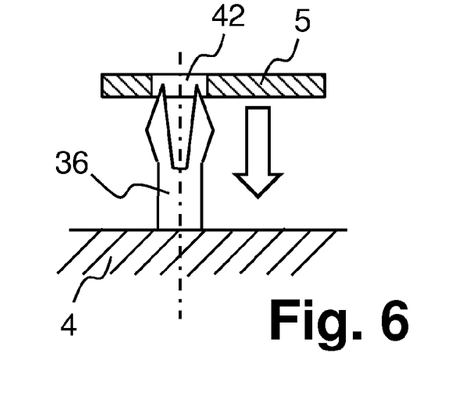
FIG. 6 is an enlarged, sectional view showing a fastening of the particle screen to the vessel by a detent element.

FIG. 6 shows the fastening of the particle screen 5 to the vessel 4 by using a detent element 36. The particle screen 5 is mounted, by way of a recess 42 provided for that purpose, onto the detent element 36. The detent element 36 has a flexibly deformable upper part which is compressed by the relatively small recess 42 during the mounting process and which springs back into the original form after the mounting process. A connection 16 is thus produced between the components by using a detent action.

Figure 7:
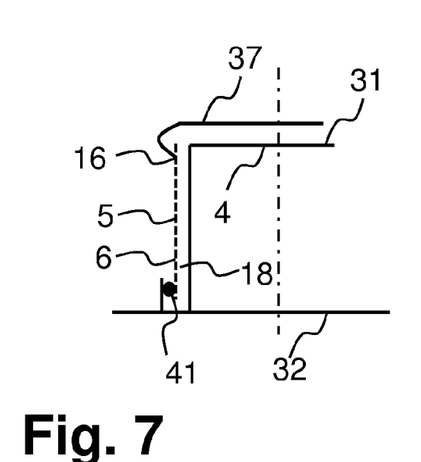
FIG. 7 is a fragmentary, elevational view showing a fastening of the particle screen by a clip element.

FIG. 7 shows the fastening of the particle screen 5 to the vessel 4 by using a clip element 37, which in this case extends over the top side 31 of the vessel. The clip element 37 encompasses the particle screen 5 at its outer screen surface 6, and thus generates a connection 16 by clamping. In this case, a seal 41 is also illustrated between the particle screen 5 and the vessel base 32. The seal 41 prevents non-purified reducing agent 15 from penetrating into the intermediate space 18. The seal 41 may be used correspondingly in the further exemplary embodiments illustrated herein.

Figure 8:
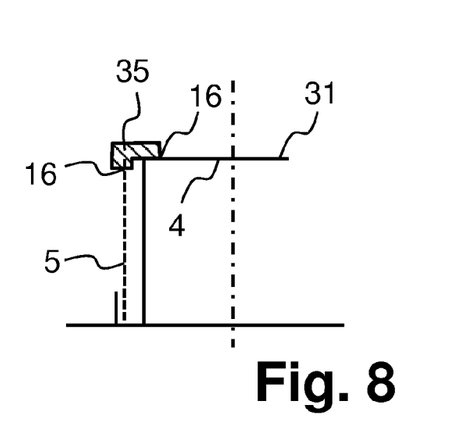
FIG. 8 is a partly sectional view showing a fastening of the particle screen to the vessel by a cohesive connection.

FIG. 8 shows the fastening of the particle screen 5 to the vessel 4 by using a cohesive connection 16. In this case, the particle screen 5 is fastened by way of an intermediate piece 35 and a cohesive connection 16, for example by welding, brazing or adhesive bonding, to the vessel 4, in this case to the top side 31 of the vessel. The particle screen 5 is partially embedded in, or encased by, the material of the intermediate piece 35. For this purpose, the intermediate piece 35 may be produced together with the particle screen 5 by casting. The intermediate piece 35 may also be correspondingly deformed after the configuration of the particle screen 5. The statements made regarding the intermediate piece 35 apply correspondingly to the vessel 4, that is to say the vessel 4 may also be correspondingly directly connected to the particle screen 5.

Figure 9:
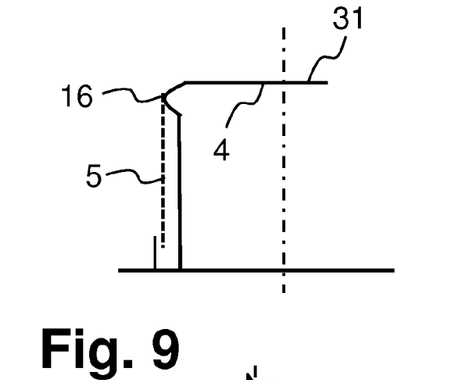
FIG. 9 is a fragmentary, elevational view showing a connection of a particle screen and a vessel by further cohesive connections.

FIG. 9 shows the connection 16 between the particle screen 5 and the vessel 4 by using a roll seam weld.

Figure 10:
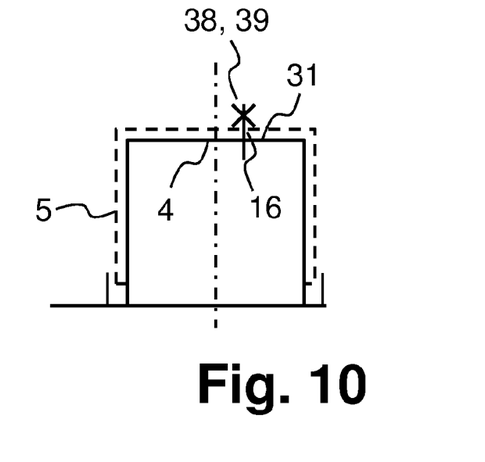
FIG. 10 is an elevational view showing a connection of a particle screen and a vessel by screw and rivet connections.

FIG. 10 shows the connection 16 between the particle screen 5 and the vessel 4 by using a screw 38 or a rivet 39, which in this case is disposed on the top side 31 of the vessel.

Figures 11, 13:
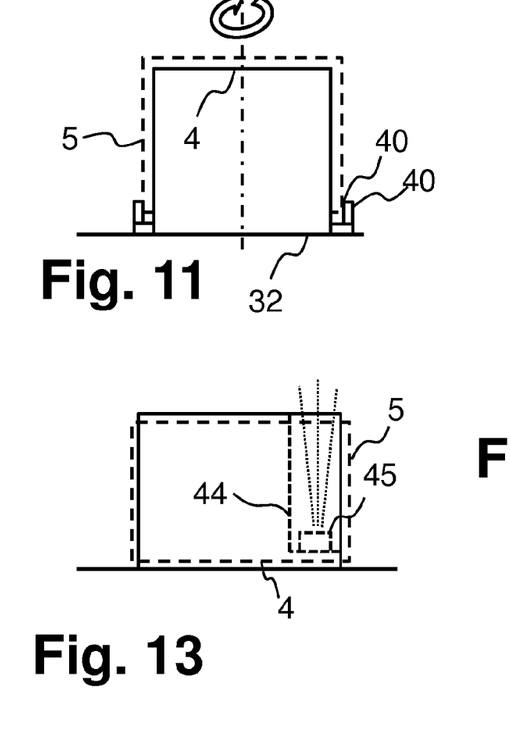
FIG. 11 is an elevational view showing a connection of a particle screen and a vessel by a thread.
FIG. 13 is an elevational view showing the clamping connection of FIG. 12.

FIG. 11 shows the connection 16 of the particle screen 5 and the vessel 4 by using screw threads 40, which in this case are disposed in the region of the vessel base 32. The particle screen 5 and the vessel 4 or a part of the vessel base 32 each have a screw thread 40, in such a way that the particle screen 5 can be screwed into the screw thread 40 disposed on the vessel 4, or as illustrated herein on the vessel base 32, by rotation of the particle screen 5 itself.

Figure 12:
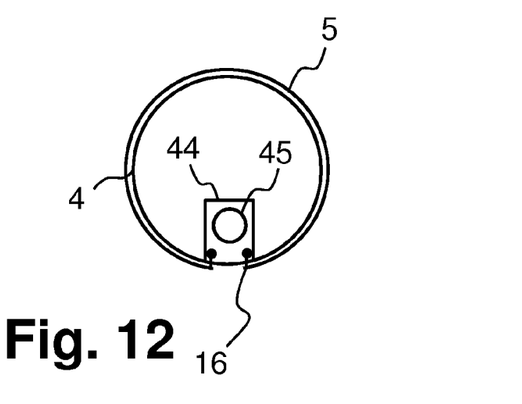
FIG. 12 is a plan view showing a fastening of the particle screen to a cutout of the vessel by a clamping connection.

FIG. 12 shows the vessel 4 in a plan view. A connection 16 of the particle screen 5 to the vessel 4 is generated by clamping, as in the structural variant according to FIG. 5. The particle screen 5 is braced with respect to the vessel, in particular clamped to a cutout 44 of the vessel 4.

An ultrasound sensor 45 disposed in the cutout 44 can be used to monitor a fill level in a reducing agent tank. The ultrasound sensor 45 is not covered by the vessel 4 from above.

The vessel 4 illustrated in FIG. 12 is illustrated in yet a further view in FIG. 13. In this case, it is possible to see the cutout 44 to which the particle screen 5 is clamped.

The ultrasound sensor 45 is situated in the cutout 44. The dotted lines illustrate the ultrasound beams, running upward from the ultrasound sensor 45, for the purpose of monitoring the fill level. The ultrasound sensor 45 is disposed in the cutout 44 so as to be free in the upward direction and not covered by regions of the vessel 4.

The present invention proposes a construction of a particle screen which is as simple and inexpensive as possible. Blockage of the particle screen can be prevented over a relatively long period of time. Furthermore, a self-cleaning effect of the particle screen can be utilized in such a way that all components for the retention of particles from the reducing agent up to the pump and/or dosing unit are practically maintenance-free. Due to the metallic construction, the particle screen itself can also be utilized as a heater. The reducing agent is correspondingly successively thawed out proceeding from the particle screen.

The invention claimed is:

1. A device for providing liquid reducing agent, the device comprising:
   a tank having an interior space;
   a vessel disposed at least partially in said interior space of said tank;
   a particle screen through which a flow can pass, said particle screen at least partially outwardly surrounding said vessel;
   a take-off point for reducing agent; and
   a delivery unit disposed in said vessel, said delivery unit configured to deliver reducing agent from said tank, through said particle screen and then to said take-off point;
   said particle screen being disposed to cause reducing agent in said tank to flow through said particle screen prior to flowing through said delivery unit.

2. The device according to claim 1, wherein said particle screen has predominantly equally dimensioned openings for a throughflow of reducing agent.

3. The device according to claim 2, wherein said openings each have a largest diameter of at most 50 μm.

4. The device according to claim 1, wherein said particle screen is formed of at least one wire mesh.

5. The device according to claim 1, wherein said particle screen includes a foil.

6. The device according to claim 1, wherein said particle screen has an outer screen surface, an inner screen surface and openings becoming smaller in a direction from said outer screen surface toward said inner screen surface.

7. The device according to claim 1, wherein said particle screen has an outer screen surface, an inner screen surface and a depth between said outer screen surface and said inner screen surface of at most 0.5 mm.

8. The device according to claim 1, wherein said particle screen is configured to carry out a self-cleaning action during operation.

9. The device according to claim 1, wherein said particle screen has an outer screen surface and an inner screen surface and at least said outer screen surface at least partially has hydrophobic or hydrophilic properties.

10. The device according to claim 1, wherein said particle screen has a corrugation.

11. The device according to claim 1, wherein said particle screen is connected to at least one of said vessel or said tank by at least one of the following fastenings:
    a) a connection by at least one of clamping, pressing or bracing;
    b) a cohesive connection;
    c) a connection by at least partial encasing; or
    d) a connection by a screw thread.

12. The device according to claim 1, wherein said delivery unit includes a heater disposed within said vessel.

13. The device according to claim 12, wherein said particle screen has sufficient thermal conductivity to introduce heat from said heater disposed in said vessel into the reducing agent in said tank.

14. The device according to claim 1, wherein said particle screen has a heater.

15. The device according to claim 1, wherein said particle screen is itself a heater.

* * * * *